United States Patent
Hackborn et al.

(10) Patent No.: US 9,880,920 B2
(45) Date of Patent: *Jan. 30, 2018

(54) PROVIDING A USER WITH FEEDBACK REGARDING POWER CONSUMPTION IN BATTERY-OPERATED ELECTRONIC DEVICES

(71) Applicant: Google Inc., Mountain View, CA (US)

(72) Inventors: Dianne K. Hackborn, Mountain View, CA (US); Daniel S. Rice, Decatur, GA (US); Amith Yamasani, San Jose, CA (US); Jason B. Parks, Austin, TX (US); Evan Millar, Pleasanton, CA (US)

(73) Assignee: Google LLC, Mountain View, CA (US)

( * ) Notice: Subject to any disclaimer, the term of this patent is extended or adjusted under 35 U.S.C. 154(b) by 892 days.

This patent is subject to a terminal disclaimer.

(21) Appl. No.: 13/632,708

(22) Filed: Oct. 1, 2012

(65) Prior Publication Data

US 2013/0042122 A1 Feb. 14, 2013

Related U.S. Application Data

(63) Continuation of application No. 12/541,415, filed on Aug. 14, 2009, now Pat. No. 8,280,456.

(51) Int. Cl.
*H03C 1/62* (2006.01)
*H04B 17/00* (2015.01)
(Continued)

(52) U.S. Cl.
CPC ...... *G06F 11/3409* (2013.01); *G06F 11/3419* (2013.01); *G06F 11/3466* (2013.01); *Y02B 60/165* (2013.01)

(58) Field of Classification Search
CPC . H04W 8/245; H04W 8/265; H04M 1/72525; H04M 2207/18; H04M 3/42178; H04B 17/23; G06F 1/3203; G06F 8/4432
(Continued)

(56) References Cited

U.S. PATENT DOCUMENTS 3,835,390 A * 9/1974 de Sa e Silva ........... H03F 3/30
330/251
5,287,287 A * 2/1994 Chamberlain et al. ......... 702/60
(Continued)

FOREIGN PATENT DOCUMENTS

| CN | 1815246 | 8/2006 |
| CN | 101350434 | 1/2009 |

(Continued)

OTHER PUBLICATIONS

International Search Report issued in PCT/US2010/045525 dated Feb. 23, 2011 (10 pages).

(Continued)

*Primary Examiner* — William D Cumming
(74) *Attorney, Agent, or Firm* — Fish & Richardson P.C.

(57) ABSTRACT

Methods, systems, and apparatus, including computer programs encoded on a computer storage medium, for providing a user with feedback regarding power consumption in a battery-operated electronic device. In one aspect, a method performed by data processing apparatus includes identifying, using the data processing apparatus, usage of a hardware component of a battery-operated electronic device that includes the data processing apparatus, attributing the usage of the hardware component to the hardware component or to a software application that uses the hardware component, recording, using the data processing apparatus, a power consumption resulting from the usage, and presenting power consumption feedback to a user using the data processing (Continued)

apparatus. The power consumption feedback identifies the hardware component or the software application of the electronic device and the power consumption resulting from the usage.

20 Claims, 8 Drawing Sheets

(51) Int. Cl.

| H04B 1/06 | (2006.01) |
|---|---|
| H04B 7/00 | (2006.01) |
| H04B 1/38 | (2015.01) |
| H04M 3/00 | (2006.01) |
| H04M 1/00 | (2006.01) |
| G06F 11/34 | (2006.01) |

(58) Field of Classification Search
USPC .... 455/115, 419, 566, 567, 574, 115.1, 260; 713/340; 702/60, 63; 348/189
See application file for complete search history.

(56) References Cited

U.S. PATENT DOCUMENTS

| 5,437,040 | A | * | 7/1995 | Campbell et al. ............ 713/340 |
|---|---|---|---|---|
| 5,714,870 | A | | 2/1998 | Dunstan |
| 5,940,452 | A | | 8/1999 | Rich |
| 6,236,674 | B1 | | 5/2001 | Morelli et al. |
| 6,263,200 | B1 | | 7/2001 | Fujimoto |
| 6,215,275 | B1 | | 10/2001 | Bean |
| 7,197,656 | B2 | * | 3/2007 | Nguyen ................. G06F 1/3203 713/320 |
| 7,251,505 | B2 | | 7/2007 | Shin et al. |
| 7,287,173 | B2 | * | 10/2007 | Hsieh ................... G06F 8/4432 713/300 |
| 7,336,929 | B2 | | 2/2008 | Yasuda et al. |
| 7,433,702 | B2 | | 10/2008 | Lindskog et al. |
| 7,583,984 | B2 | | 9/2009 | Sun et al. |
| 7,634,668 | B2 | * | 12/2009 | White .................. G06F 1/3203 702/60 |
| 7,680,041 | B2 | | 3/2010 | Johansen |
| 7,730,331 | B2 | | 6/2010 | Yoon et al. |
| 8,280,456 | B2 | * | 10/2012 | Hackborn et al. ............ 455/574 |
| 8,285,340 | B2 | * | 10/2012 | Hackborn et al. ............ 455/567 |
| 8,538,484 | B2 | * | 9/2013 | Chan et al. ................... 455/566 |
| 2003/0069704 | A1 | | 4/2003 | Bean |
| 2003/0119460 | A1 | * | 6/2003 | Zipper .................. H04B 17/23 455/115.1 |
| 2003/0221133 | A1 | * | 11/2003 | Nguyen ................ G06F 1/3203 713/300 |
| 2004/0039954 | A1 | * | 2/2004 | White .................. G06F 1/3203 713/322 |
| 2004/0266493 | A1 | | 12/2004 | Bahl et al. |
| 2005/0003785 | A1 | * | 1/2005 | Jackson .................... G01S 7/35 455/260 |
| 2005/0070339 | A1 | | 3/2005 | Kim |
| 2005/0085277 | A1 | | 4/2005 | Chen et al. |
| 2005/0138450 | A1 | * | 6/2005 | Hsieh .................... G06F 8/4432 713/320 |
| 2005/0143144 | A1 | | 6/2005 | Shin et al. |
| 2006/0279256 | A1 | | 12/2006 | Bletsas |
| 2008/0057894 | A1 | | 3/2008 | Milivoje et al. |
| 2008/0268828 | A1 | * | 10/2008 | Nagaraja ...................... 455/419 |
| 2009/0164152 | A1 | * | 6/2009 | Creus .................... G06F 1/3203 702/63 |
| 2010/0122102 | A1 | * | 5/2010 | Park ................... H04N 5/44504 713/340 |
| 2010/0131787 | A1 | * | 5/2010 | White ................... G06F 1/3203 713/322 |
| 2010/0141777 | A1 | * | 6/2010 | Jin et al. ....................... 348/189 |
| 2011/0040990 | A1 | | 2/2011 | Chan et al. |
| 2011/0040996 | A1 | | 2/2011 | Hackborn et al. |

FOREIGN PATENT DOCUMENTS

| CN | 101432678 | 5/2009 |
|---|---|---|
| CN | 101504564 | 8/2009 |
| EP | 1524829 A | 4/2005 |
| EP | 1594232 A | 11/2005 |
| EP | 2075590 | 7/2009 |
| JP | 2007034737 | 2/2007 |
| JP | 2009-093295 | 4/2009 |
| JP | 2010-016802 | 1/2010 |
| KR | 10-2000-0072022 | 12/2000 |
| KR | 10-698162 | 2/2007 |
| KR | 10-2007-0102227 | 10/2007 |
| WO | WO 2004/105417 | 12/2004 |
| WO | WO 2005/006722 | 1/2005 |
| WO | WO 2005/009062 | 1/2005 |
| WO | WO 00/39908 A | 11/2005 |

OTHER PUBLICATIONS

Smartphone—Wikipedia Dec. 15, 2011.
Office Action from USPTO in U.S. Appl. No. 13/245,476 dated (Jan. 3, 2012).
Office Action issued in Chinese Application No. 201080040517.3 dated Apr. 30, 2014, 15 pages (with English translation).
Office Action from USPTO in U.S. Appl. No. 12/541,415, dated Nov. 16, 2011, 16 pages.
Notice of Allowance in Japanese Application No. 2012-524917, dated Oct. 14, 2014, 5 pages (with English translation).
Office Action issued in Korean Application No. 10-2014-7029401 dated Aug. 25, 2015, 7 pages (with English translation).
Office Action issued in Chinese Application No. 201510654565.6, dated Jul. 24, 2017, 10 pages (with English Translation).
Flinn et al. "PowerScope: a tool for profiling the energy usage of mobile applications," Mobile Computing Systems and Applications, Feb. 25-26, 1999, 9 pages.
Office Action issued in European Application No. 10808843.6, dated Oct. 24, 2017, 7 pages.

* cited by examiner

PROVIDING A USER WITH FEEDBACK REGARDING POWER CONSUMPTION IN BATTERY-OPERATED ELECTRONIC DEVICES

BACKGROUND

This specification relates to providing a user with feedback regarding power consumption in a battery-operated electronic device.

Modern electronic devices provide a staggering array of functionality to users. Battery-operated portable handheld electronic devices such as telephones, music players, PDA's, and game players can display information on display screens, receive instructions from a user, communicate with other devices using wired and wireless data links, take digital photographs, and process large volumes of digital data at speeds that were unthinkable even a generation ago. Such functionality is implemented using hardware components such as, e.g., display screens, keyboards and keypads, communications interfaces, digital data processors, charge-coupled devices, and other integrated circuits that coordinate the operation of these and other hardware components. These various hardware components consume electrical power and thus help to deplete a battery or batteries in an electronic device.

SUMMARY

This document discusses systems, methods, and techniques by which a battery-operated electronic device, such as a smartphone or a netbook computer, can provide a user with information about which hardware components of the device consume, or are likely to consume, the most power on the device. For example, a device may display to the user a list of all power consuming hardware components or software applications that are currently operating on the device, along with an indication of how much power each hardware component or software application is consuming (either at the exact instant in time, or over a defined time period). Such indications may be shown as an absolute value (e.g., in Watts or milli-watts) or as a relative value (e.g., in terms of the total power being consumed by all components or applications on the device, or of all components or applications that the user can currently disable). A graphical representation may also be provided so as to help the user make decisions about which components or applications to disable in order to save power. For example, bars graphs may be shown for each component or application, where the length of the bar approximates the amount of power consumed by the component, or a pie graph may be shown in a similar manner, where the size of each slice represents the relative amount of power consumed by a corresponding component. Displays like those just discussed may be shown in response to an explicit user request (e.g., by the user navigating to a tools menu on a device or selecting a power management icon on a desktop or other area of a display on the device) or in response to other events, such as when the device falls below a certain level of power (e.g., 30%) at which a user can be expected to start shutting down non-essential components. In other instances, the system may automatically shut down components or applications in a stepped manner at multiple different battery levels (based on a plan set for the system when it is shipped or by the user at a later time), or may provide suggestions to a user that the user can accept or reject. Such a system can also provide the user with an estimate of the amount of time remaining on their battery if the component or application is left on or turned off, or an estimate of the amount of time that will be added to the battery life by turning off a component or application.

Accordingly, in a first general aspect, a method performed by data processing apparatus is described. The method includes identifying, using the data processing apparatus, usage of a hardware component of a battery-operated electronic device that includes the data processing apparatus, attributing the usage of the hardware component to the hardware component or to a software application that uses the hardware component, recording, using the data processing apparatus, a power consumption resulting from the usage, and presenting power consumption feedback to a user using the data processing apparatus. The power consumption feedback identifies the hardware component or the software application of the electronic device and the power consumption resulting from the usage.

This and other aspects can include one or more of the following features. The method can include monitoring usage of the component by the application and converting the usage of the component into the power consumption that is attributed to the application. The component can include a wireless transceiver. The usage of the component can be converted into the power consumption by identifying a range of signal strengths during the usage of the wireless transceiver. The component can include a display. The usage of the component can be converted into the power consumption by identifying a brightness state of the display during the usage.

The method can also include identifying a start of a new period and clearing a record of power consumption for the previous period in response. Information in the record of power consumption for the previous period can be transferred into a long term record of power consumption in response to the identification of the start of the new period. Presenting the power consumption feedback to the user can include displaying a presentation that identifies applications and indications of amounts of power consumed by the identified applications and/or displaying a presentation that identifies different classes of periods and indications of average amounts of power consumed during operation in the different classes.

Other embodiments of this aspect include corresponding systems, apparatus, and computer programs, configured to perform the actions of the methods, encoded on computer storage devices.

In a second general aspect, a battery-operated electronic devices is described. The battery-operated electronic device includes a battery, a collection of hardware components including a data processing unit configured to execute a plurality of different applications, and a display screen. The display screen presenting an accounting of power consumed by the different applications.

This and other aspects can include one or more of the following features. The electronic device can include a power measurement unit. The power measurement unit can be implemented in hardware and for measuring a parameter characterizing power consumed by a first component of the collection of components. The power measurement unit can include an ammeter. The display screen can present an accounting of power consumed by different components in the collection.

The electronic device can also include a data storage device. The data storage device can store a structured collection of information characterizing power consumed by the different applications during a present period and a structured collection of information characterizing power consumed by the different applications over a long term. The long term is longer than the present period.

The data processing unit can be configured to monitor activities performed using hardware components in the collection by the different applications and to calculate power consumption estimates attributable to respective of the different applications. The electronic device can also include one or more persistent data storage devices storing conversion rules for estimating power consumptions by the different applications.

Other embodiments of this aspect include corresponding systems, methods, and computer programs.

In a third general aspect, a computer storage medium encoded with a computer program is described. The program includes instructions that when executed by data processing apparatus cause the data processing apparatus to perform operations. The operations include monitoring activities performed by applications executed by a data processing apparatus of a battery-operated electronic device, estimating power consumptions for the activities, recording information characterizing the power consumptions in association with information identifying the applications that performed the activities, and presenting a user with an accounting of the estimated power consumption by the applications on a display screen of the battery-operated electronic device based on the recorded information.

This and other aspects can include one or more of the following features. The power consumptions for the activities can be estimated by identifying that a first application holds a lock and attributing additional power consumed during the lock to the first application. The lock can maintain the hardware component in an active state. The lock can be a wake lock. The power consumptions for the activities can be estimated by identifying that a second application holds the wake lock at the same time that the first application holds the wake lock and attributing additional power consumed during the wake lock in part to the first application and in part to the second application.

The power consumptions for the activities can be estimated by identifying that the first application requests that a hardware sensor be active. The operations can include recording information characterizing the power consumptions in association with information identifying the hardware components used by the applications to perform the activities.

Other embodiments of this aspect include corresponding systems, apparatus, and method for performing the operations.

The details of one or more implementations are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
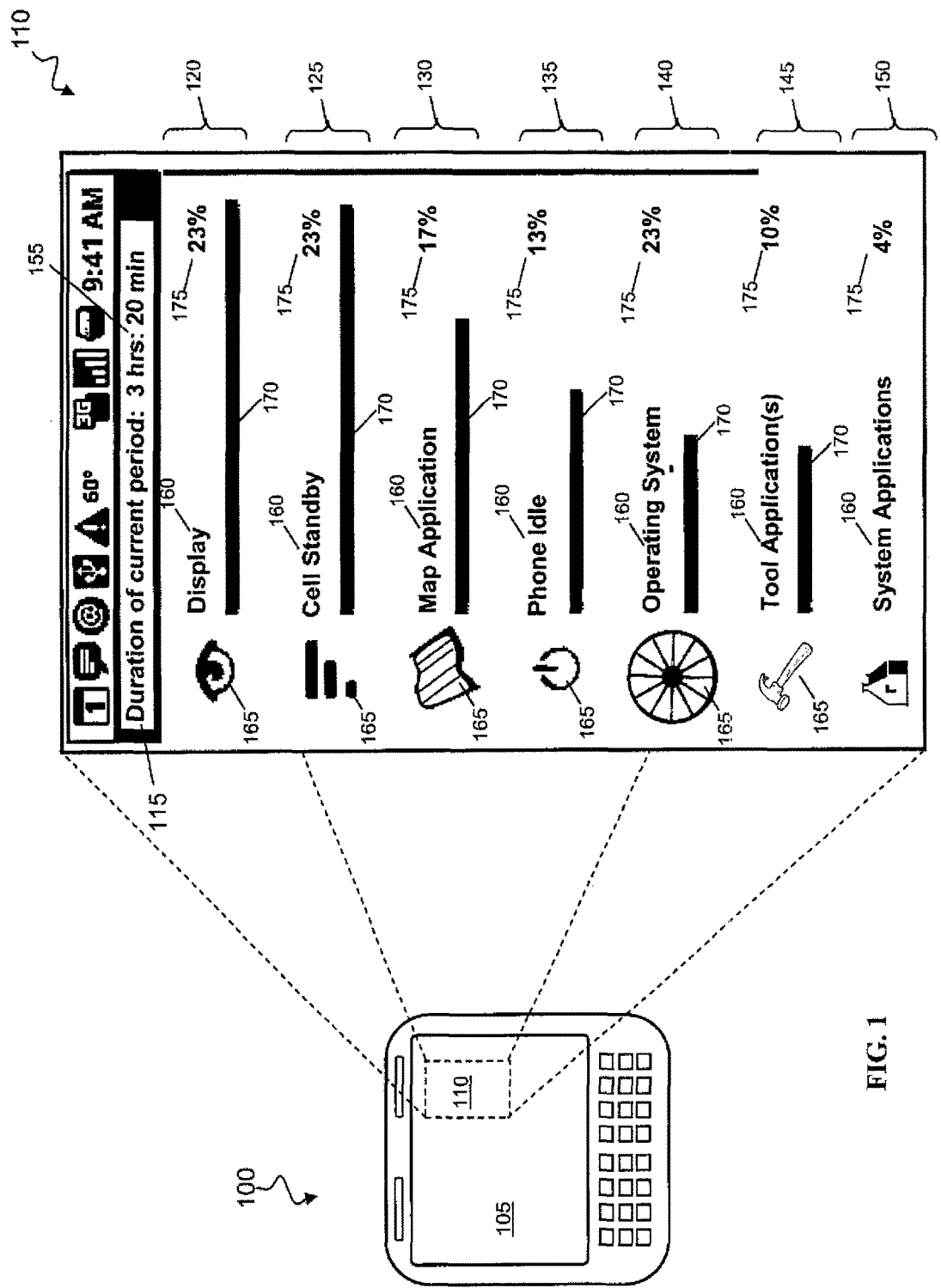
FIG. 1 is a schematic representation of how a user can be provided with feedback regarding power consumption in a battery-operated electronic device.

FIG. 1 is a schematic representation of one way that a user can be provided with feedback regarding power consumption in a battery-operated electronic device 100. In general, device 100 visually shows to a user a plurality of hardware components or software applications operating in device 100, along with a relative amount of power that each of those components or applications is consuming from the device's battery system.

Electronic device 100 can be, e.g., a telephone, music player, a PDA, a game player or other device that includes a display screen 105 that presents graphical images to a user. A portion of display screen 105 includes a power consumption feedback presentation 110. Power consumption feedback presentation 110 presents a user with feedback regarding power consumption by device 100 and can allow a user to understand how the battery power available to electronic device 100 has been or is likely to be spent.

Feedback presentation 110 includes a period identifier 115 and a collection of account entries 120, 125, 130, 135, 140, 145, 150. Period identifier 115 includes text or other information 155 that identifies the period of time for which power consumption feedback is presented in feedback presentation 110. In the illustrated implementation, information 120 identifies that power consumption for a period of a certain duration (i.e., the "current period" of the last three hours and 20 minutes) is provided. In other implementations, power consumption feedback can be provided for periods of time when, e.g., a certain user uses device 100, certain processes are running on device 100, or the like.

Account entries 120, 125, 130, 135, 140, 145, 150 are records that present an accounting of the power consumption of device 100. Different entries 120, 125, 130, 135, 140, 145, 150 can present an accounting of different aspects of the power consumption such as, e.g., the power consumption by one or more hardware components of device 100 or the power consumption by one or more software applications executed on of device 100. For example, in the illustrated implementation, account entry 120 presents an accounting of the power consumption by display screen 105. Account entry 130 presents an accounting of the power consumption by a map application.

In the illustrated implementation, each account entry 120, 125, 130, 135, 140, 145, 150 includes a title 160, a pictorial symbol 165, a visual indicium of power consumption 170, and a textual indicium of power consumption 175. Title 160 is text that identifies the aspect of the power consumption of device 100 for which an accounting is presented in the respective entry. For example, title 160 in entry 140 identifies that entry 140 presents an accounting of power consumption by the operating system of device 100. Title 160 in entry 135 identifies that entry 135 presents an accounting of power consumption by an idle phone of device 100.

Pictorial symbols 165 are pictorial representations of the aspects of the power consumption of device 100 for which accountings are presented in the respective entries. For example, symbol 165 in entry 145 represents that entry 145 presents an accounting of power consumption by tool applications of device 100. Symbol 165 in entry 125 identifies that entry 125 presents an accounting of power consumption by the standby state of a cellular communication system of device 100.

Each visual indicia 170 and textual indicia 175 presents an accounting of the power consumption by the aspects identified by title 160 and represented by symbol 165 in each account entry 120, 125, 130, 135, 140, 145, 150. In the illustrated implementation, textual indicia 175 include text that identifies the percent of the total power consumed by different aspects. Visual indicia 170 are bars of different lengths. The lengths of the bars are normalized to the highest power consumption by any aspect during the period identified by period identifier 115. For example, in the illustrated implementation, visual indicia 170 in entries 120, 125 are the same length and are each represent 23% of the total power consumption during the current period. In contrast, visual indicium 170 in entry 145 represents 10% of the total power consumption during the current period and is 10/23rds of the length of visual indicia 170 in entries 120, 125. In other implementations, the characteristics of visual indicia 170 can be normalized to, e.g., a total power consumption during the period identified by period identifier 115.

Figure 2:
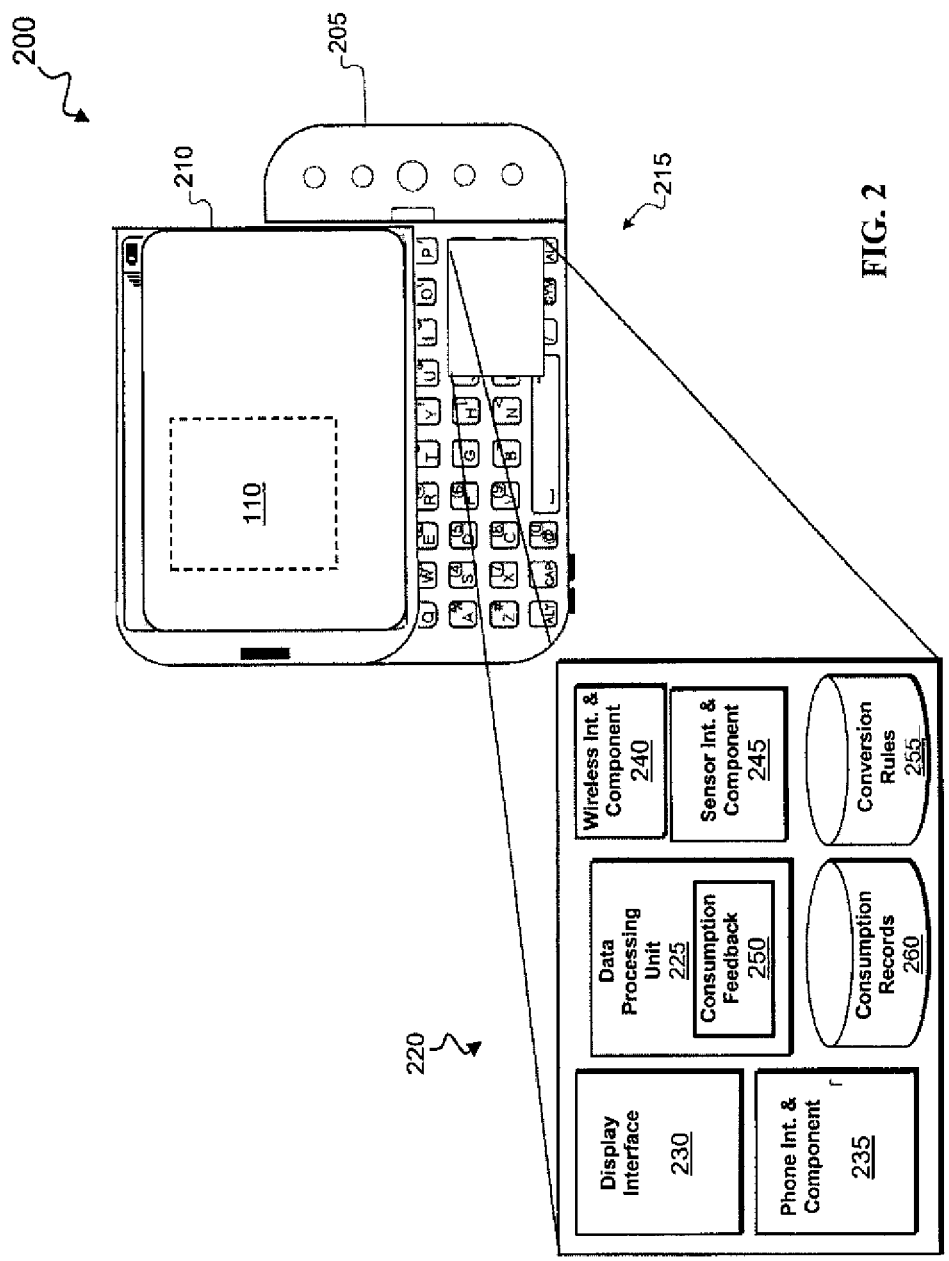
FIG. 2 is a schematic diagram of a battery-operated electronic device.

FIG. 2 is a schematic diagram of another battery-operated electronic device 200. In general, the device 200 both provides a user with functionality and allows the user to obtain information about particular power consumption by certain of the power-consuming components or applications in the device 200.

Device 200 includes a housing 205 onto which a touch screen display 210 is moveably mounted. Touch screen display 210 is moveable to expose and cover a keyboard 215. A portion of touch screen display 210 can include a power consumption feedback presentation 110 (FIG. 1). Power consumption feedback presentation 110 occupies all or a portion of touch screen display 210.

Housing 205 houses a collection 220 of electronic hardware components that cooperate to provide different functionality to the user. Electronic hardware component collection 220 includes a data processing unit 225, a display interface 230, a phone interface and component 235, a wireless interface and component 240, and a sensor interface and component 245. Data processing unit 225, interface 230, and interface and components 235, 240, 245 can be implemented in electronic circuitry, in computer software, firmware, or hardware, or in combinations of these and other elements.

Display interface 230 is a device that is configured to allow data processing unit 225 to direct the presentation of information on touch screen display 210. For example, display interface 230 can receive instructions for displaying content on touch screen display 210 from data processing unit 225. Display component 230 can translate those instructions and cause the content to be appropriately presented on touch screen display 210.

Phone interface and component 235 is a phone and an interface that is configured to allow data processing unit 225 to exchange data with the phone. Wireless interface and component 240 is a wireless transceiver and an interface that is configured to allow data processing unit 225 to exchange data with the wireless transceiver. Wireless interface and component 240 can thus communicate with other devices on a wireless network. Sensor interface and component 245 is a sensor and an interface that is configured to allow data processing unit 225 to exchange data with the sensor. The sensor can be, e.g., a hardware sensors such as an accelerometer, a compass, a global positioning system, a digital camera, or the like.

Data processing unit 225 is a device that is configured to process digital data. Data processing unit 225 can be, e.g., a generic purpose data processor that performs operations in accordance with the instructions of application and other programs. Among the operations performed by data processing unit 225 is a consumption feedback application 250.

Consumption feedback application 250 is a set of data processing activities that are designed to create and accounting of the consumption of power by different aspects of device 200 so that feedback regarding that power consumption can be provided to a user.

During the performance of the activities of consumption monitor 250, data processing unit 225 can access conversion rules 255 and write to consumption records 260. Conversion rules 255 and consumption records 260 are stored in device 200, e.g., in one or more persistent data storage devices. Various forms of persistent data storage may be provided, e.g., fixed disk drives and/or solid state memory devices. Conversion rules 255 are rules for converting characteristics of the operations performed by device 200 into a power consumption. Consumption records 260 are historical records of the power consumed by different aspects of the device and its operations. For example, consumption records 260 can provide an accounting of the power consumption by the same aspects identified and represented in account entries 120, 125, 130, 135, 140, 145, 150 (FIG. 1).

Figure 3:
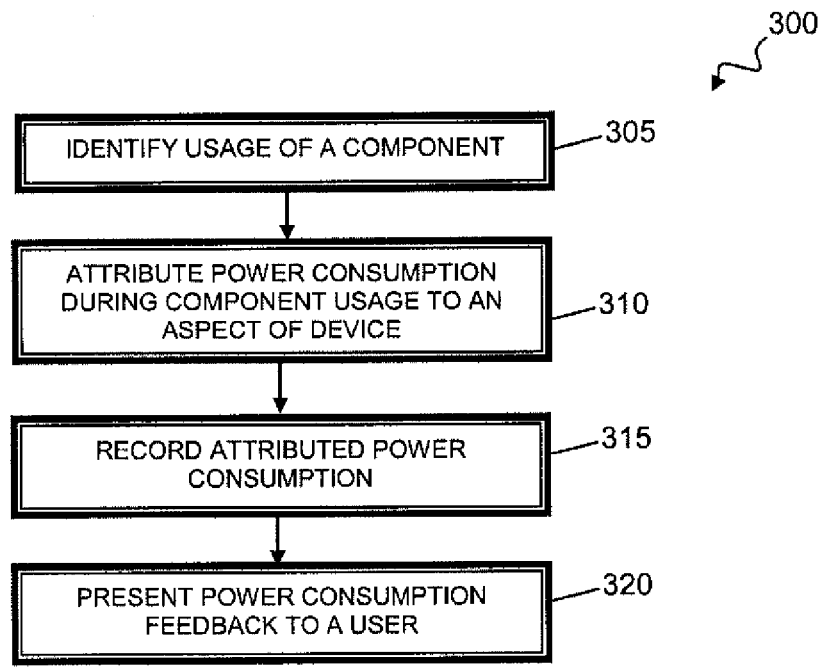
FIG. 3 is a flowchart of a process that can be performed by a battery-operated electronic device to provide a user with feedback regarding power consumption.

FIG. 3 is a flowchart of a process 300 that can be performed by a battery-operated electronic device to provide a user with feedback regarding power consumption. Process 300 can be performed by one or more digital data processing devices that perform operations by executing one or more sets of machine-readable instructions. For example, process 300 can be performed by data processing unit 225 executing consumption feedback application 250 in device 200 (FIG. 2). Process 300 can be performed in isolation or in conjunction with other digital data processing operations.

The device performing process 300 can identify the usage of a hardware component of a battery-operated device at block 305. The usage of a hardware component can be identified, e.g., by monitoring power drawn by the hardware component, by monitoring for activities performed by applications with the component, or by monitoring for messages such as instructions to the hardware component or descriptions of the activities from the applications themselves. For example, in the context of FIG. 2, the content of instructions sent from data processing unit 225 to one or more of interface 230 and interface and components 235, 240, 245 can be relayed to consumption feedback application 250 so that it can identify usage of the destination interfaces and components.

The device performing process 300 can attribute the power consumption during the usage of the component to an aspect of the device at block 310. For example, power consumption can be attributed to a hardware component of the device (e.g., to a display screen, to a cell phone, to a transceiver, to a data processing unit, to a digital camera, or to an accelerometer or other sensor) or power consumption can be attributed to an application executed by the device (e.g., to the operating system software, to a map application, to a game application, to mail or other messaging application, to a web browser application, to a music or video player application, or to a tool application).

In some implementations, power consumption during usage of the component can be attributed to multiple aspects of the device. For example, power consumed by an accelerometer during a game can be attributed to both the accelerometer and to the game itself. As another example, the additional power that is consumed during a wake lock that is held by more than one application can be attributed to all of the holding applications, as described further below.

The device performing process 300 can record the attributed power consumption, e.g., in a persistent data storage device at block 315. For example, the device can record an estimate or a measurement of the amount of power that was consumed during the component usage in association with an identifier of the aspect to which that usage was attributed in a data table or other data structure. Such recording can in effect create a historical record of the power consumption by different aspects of the device.

The device performing process 300 also presents feedback regarding the power consumption of the device to a user at block 320. For example, in some implementations, the system can present one or more of power consumption feedback presentation 110 (FIG. 1), and power consumption feedback presentations 1105, 1110 (FIG. 11) to present feedback regarding power consumption by different aspects of an electronic device.

Figure 4:
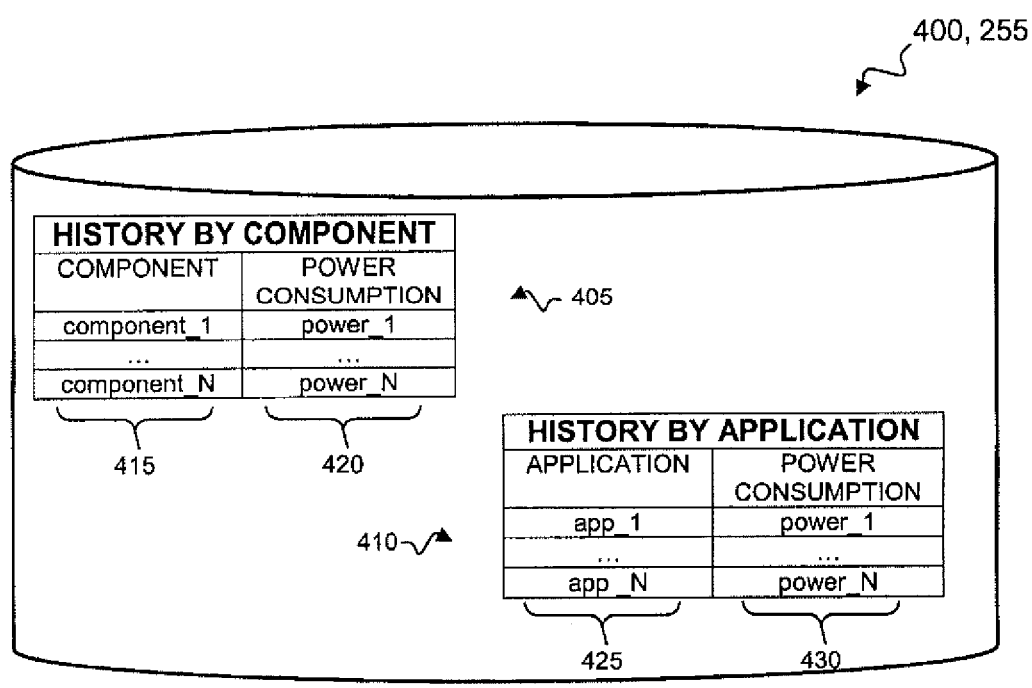
FIG. 4 is a schematic representation of a record of the power consumption by different aspects of an electronic device.

FIG. 4 is a schematic representation of a record 400 of the power consumption by different aspects of an electronic device. Record 400 can be used as consumption records 260 in electronic device 200 (FIG. 2) and can be formed during block 315 in process 300 (FIG. 3).

Record 400 includes a history by component table 405 and a history by application table 410. History by component table 405 is a data structure that associates identifiers of the components to which power consumption is attributed in a column 415 with information describing the amount of power attributed to those respective components in a column 420. History by application table 410 is a data structure that associates identifiers of the applications to which power consumption is attributed in a column 425 with information describing the amount of power attributed to those respective applications in a column 430. The information stored in record 400 can be accessed by data processing unit 225 during data processing activities such as consumption feedback application 250 (FIG. 2).

Figure 5:
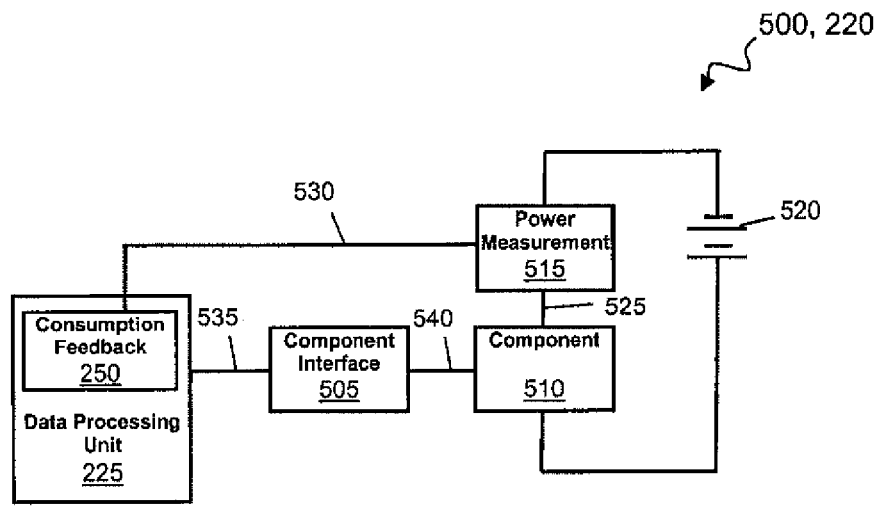
FIG. 5 is a schematic representation of a system that implements a hardware-based approach for identifying and attributing usage of a hardware component of a battery-operated electronic device.

FIG. 5 is a schematic representation of a system 500 that implements a hardware-based approach for identifying and attributing usage of a hardware component of a battery-operated electronic device. In addition to a data processing unit 225 that executes a consumption feedback application 250, system 500 also includes a component interface 505, a component 510, and a power measurement unit 515. Component interface 505 and component 510 are components of a battery-operated electronic device. For example, Component interface 505 and component 510 can be, e.g., display interface 230 and display 210 or any of interface and components 235, 240, 245 (FIG. 2).

Power measurement unit 515 is a device configured to measure the power consumed by component 510. Power measurement unit 515 can be, e.g., an ammeter that measures current flow from a battery 520 into a power terminal 525 of component 510. The power consumed by component 510 can be deduced or estimated from such a measurement based on the potential provided by battery 520. Power measurement unit 515 outputs a signal 530 representative of the measured parameter.

Data processing unit 225 exchanges information 535 with component interface 505. Information 535 can include, e.g., output requests that component 510 perform specified operations and input information characterizing the operation of component 510. Component interface 505 itself exchanges corresponding information 540 with component 510. Information 540 can include, e.g., instructions for performing the operations requested by data processing unit 225 or information from component 510 characterizing its operation.

Data processing unit 225 also receives signal 530 and conveys information describing both the source (i.e., the identity of a specific power measurement unit 515 in a system with multiple units) and the information content of signal 530 to consumption feedback application 250. Consumption feedback application 250 can use the information representative of the measured parameter to identify the usage of component 510. For example, when the power consumed by component 510 increases, consumption feedback application 250 can identify that component 510 is being used. The description of the source of signal 530 that can be used to attribute that power increase to component 510.

In some implementations, consumption feedback application 250 includes an application monitor module or other software mechanism for attributing the power increase at component 510 to specific applications executed by data processing unit 225. For example, consumption feedback application 250 can monitor the amount of information displayed on display screen 210 by different applications and attribute the power usage by display screen 210 to those applications.

In some implementations, power measurement unit 515 measures power consumed by both component interface 505 and component 510. In such cases, signal 530 represents combined measurements. The combined measurements can be attributed to component 510 or to an application executed by data processing unit 225 in the same manner as individual measurements. Such combined measurements are particularly relevant where the power consumption by component interface 505 is not negligible in comparison to the power consumption at component 510.

Figure 6:
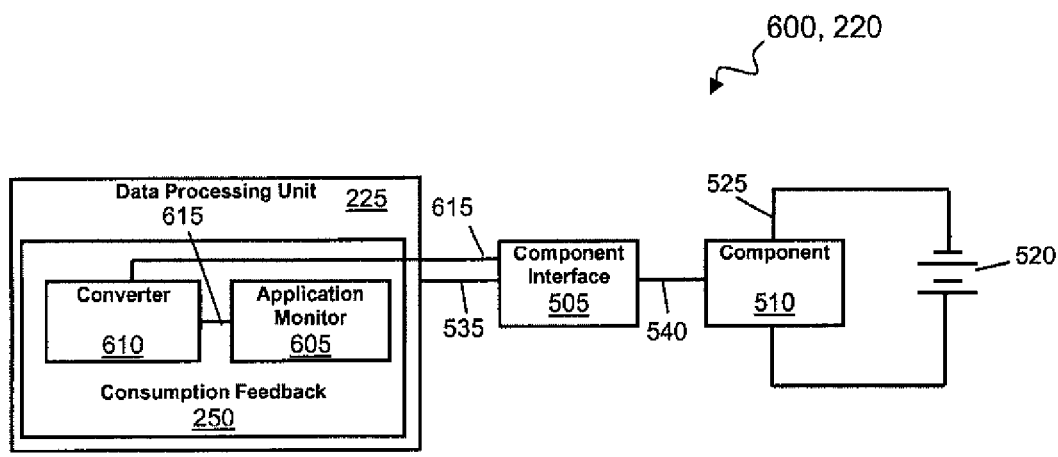
FIG. 6 is a schematic representation of a system that implements a software-based approach for identifying and attributing usage of a hardware component of a battery-operated electronic device.

FIG. 6 is a schematic representation of a system 600 that implements a software-based approach for identifying and attributing usage of a hardware component of a battery-operated electronic device. Consumption feedback application 250 includes an application monitor module 605 and a usage-to-power consumption converter module 610.

Application monitor module 605 is a set of computer program instructions that, when executed by data processing unit 225, cause data processing unit 225 to monitor the activities performed by data processing unit 225 and other components for different applications. Application monitor module 605 can, e.g., monitor the number of calculations performed by data processing unit 225 when executing an application, monitor the amount of wireless traffic generated on a component by an application (e.g., traffic over either a cellular or a WI-FI network), monitor the hold and release of wake locks by different applications, monitor the usage of accelerometers or other sensors, and the like.

Application monitor module 605 is a set of computer program instructions that, when executed by data processing unit 225, cause data processing unit 225 to convert the activities performed by components for different applications into a power consumption. In general, the conversion can yield estimates of power consumption based on estimates amount of power consumed during an activity. For example, an estimate of the amount of power consumed per unit of a certain class of wireless traffic (e.g., cellular traffic or WI-FI traffic) can be used to estimate the power consumed by the wireless traffic generated by an application. As another example, an estimate of the cost to maintain an electronic device in a wake state can be used to estimate the power consumed by an application that locks the electronic device in the wake state.

Figure 7:
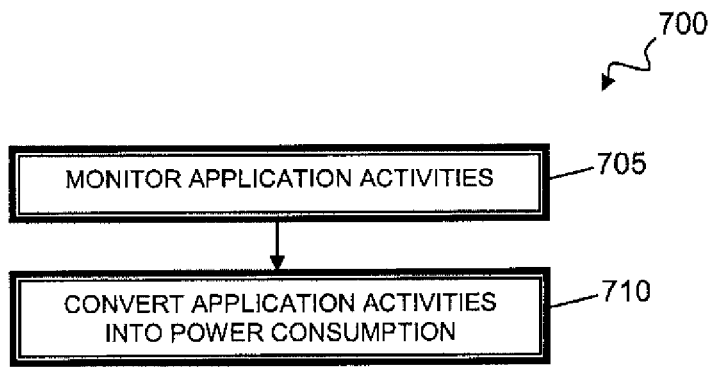
FIG. 7 is a flowchart of a process that can be performed by a battery-operated electronic device to provide a user with feedback regarding power consumption.

FIG. 7 is a flowchart of a process 700 that can be performed by a battery-operated electronic device to provide a user with feedback regarding power consumption. Process 700 can be performed by one or more digital data processing devices that perform operations by executing one or more sets of machine-readable instructions. For example, process 700 can be performed by data processing unit 225 executing consumption feedback application 250 that includes a converter module 610 and an application monitor 605 (FIG. 6). Process 700 can be performed in isolation or in conjunction with other digital data processing operations. For example, process 700 can be performed at blocks 305, 310 in process 300 (FIG. 3) to identify usage of components and attribute the power consumed during such usage to different applications.

The device performing process 700 can monitor the activities that are performed when executing different applications at block 705. The activities can be attributed to the executed application. For example, the computational requirements of processes used by an application can be monitored and the process activities can be attributed to that application. As another example, the network traffic generated when executing a browser application can be monitored and the traffic can be attributed to the browser.

The device performing process 700 can convert the activities of the different applications into a power consumption at block 710. The conversion can yield estimates of the amount of power consumed by the different applications and can be performed using rules for converting the activities into a power consumption, such as conversion rules 255 (FIG. 2). The rules for converting the activities into a power consumption can be based on estimates of the power required by different components to perform different activities. In some implementations, these power consumption estimates can be a function of the operating conditions of the components.

Figure 8:
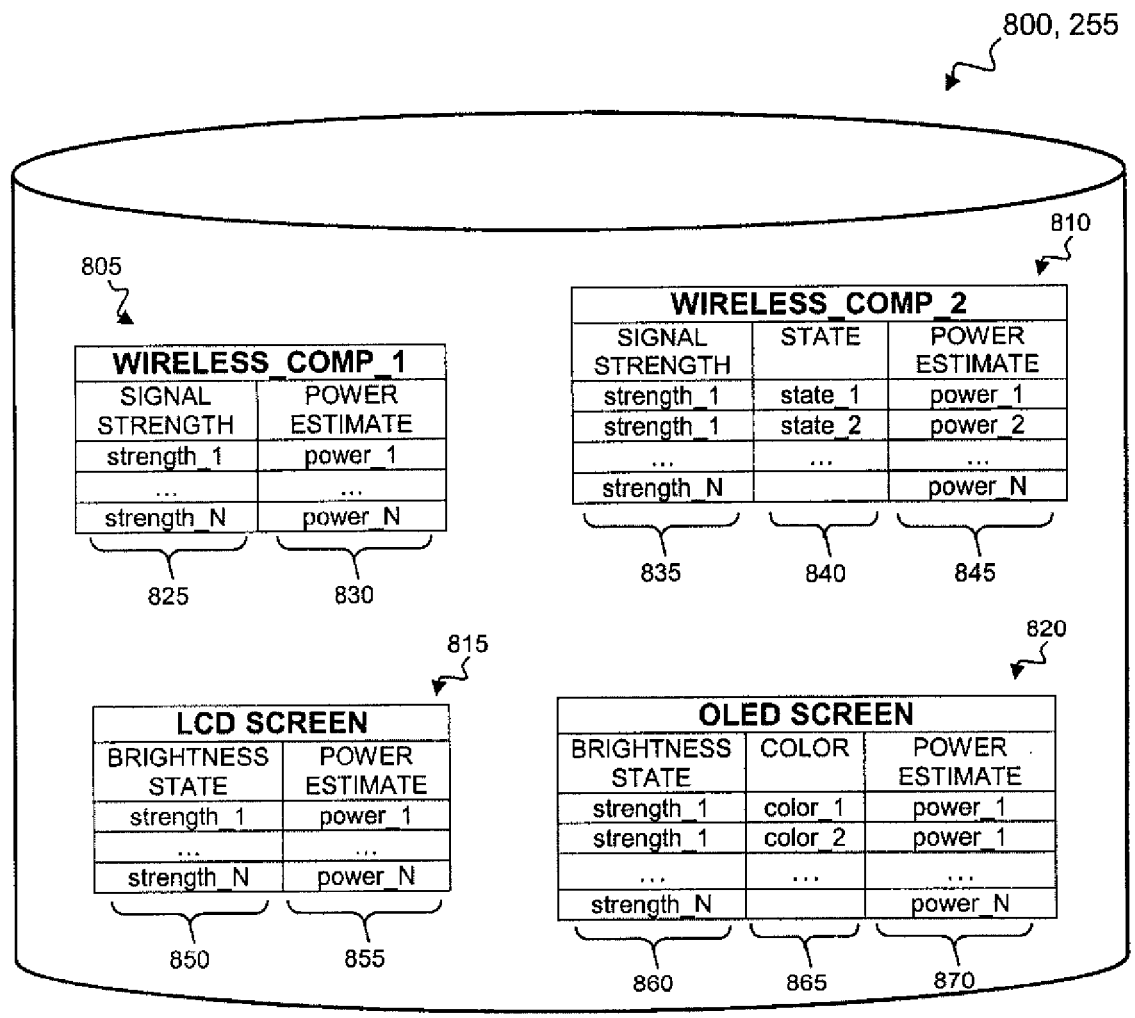
FIG. 8 is a schematic representation of a collection of estimates of the power required by different components to perform different activities.

FIG. 8 is a schematic representation of a collection 800 of estimates of the power required by different components to perform different activities. Estimate collection 800 can express or be used in conjunction with conversion rules 255 in electronic device 200 (FIG. 2).

Estimate collection 800 includes one or more data structures that store information that characterizes estimates of the power consumption by different components under different operating conditions. In the illustrated example, estimate collection 800 includes a first wireless component table 805, a second wireless component table 810, an LCD screen table 815, and an OLED screen table 820.

First wireless component table 805 includes a pair of columns 825, 830. Column 825 includes information identifying different ranges of signal strength under which a first wireless transceiver component operates. Column 830 includes estimates of the power consumed by the transmission or the reception of a signal by the first wireless component when operating under the corresponding range of signal strength in column 825. The estimates can be expressed, e.g., per unit time that the first wireless component is transmitting or receiving information or per amount of data that is transmitted or received by the first wireless component.

Second wireless component table 810 includes a collection of columns 835, 840, 845. Column 835 includes information identifying different ranges of signal strength under which a second wireless transceiver component operates. Column 840 includes information identifying various states in which the second wireless transceiver component operates. For example, the information in column 840 can identify scanning states, multicast states, or other states of the second wireless transceiver. Column 845 includes estimates of the power consumed by the transmission or the reception of a signal by the second wireless component when operating in the corresponding state in column 840 under the corresponding range of signal strength in column 835. The estimates can be expressed, e.g., per unit time that the second wireless component is transmitting or receiving information or per amount of data that is transmitted or received by the second wireless component.

Liquid crystal display (LCD) screen table 815 includes a pair of columns 850, 855. Column 850 includes information identifying various states in which an LCD screen operates. For example, the information in column 850 can identify different brightness levels of the LCD screen and its backlight. Column 855 includes estimates of the power consumed by LCD screen when operating at the corresponding brightness in column 850.

Organic light-emitting diode (OLED) screen table 820 includes a collection of columns 860, 865, 870. Column 860 includes information identifying various states in which an OLED screen display operates. For example, the information in column 860 can identify different brightness levels of the OLED screen display. Column 860 includes information identifying the colors in which an OLED screen display. The power consumed by an OLED screen display is a function of the number and color of illuminated pixels. Column 870 includes estimates of the power consumed by LCD screen when illuminating pixels of the corresponding color in column 865 at the corresponding brightness in column 850.

The following are examples of how the performance of activities on different components can be converted into a power consumption that can be attributed to that component or to an application.

Data Processing Unit 225:

In some implementations, the number of cycles executed by different processes over a period of time (or a related parameter that reflects computational intensity) can be measured. The measurement result can then be multiplied by a factor that embodies the power usage per unit time.

Wireless Transceivers:

The power consumed by a wireless transceiver is a function of the type of transceiver and its signal strength. The data transmission and reception activities of each wireless transceiver in an electronic device can be assigned to a different bin according to an average signal strength during those activities. In other words, there may be a total of N*Y bins in an electronic device, wherein N is the number of wireless transceivers and Y is the number of signal strength ranges. For example, there may be five different ranges of signal strength for each wireless transceiver. Each time the data transmission and reception activities of the electronic device switch between bins, the data transmission and reception activity assigned to the former bin can be multiplied by an estimate of the power drawn by a transceiver operating within the corresponding range of signal strength. This estimate of the power consumption can be attributed to one or both of:
- the wireless transceiver and added to the amount of power attributed to that wireless transceiver in a column 420 of table 405 (FIG. 4), and
- the application for which the transmission and reception activities were performed and added to the amount of power attributed to that application in a column 430 of table 410 (FIG. 4).

Wake Lock Usage:

A wake lock is a lock that is held by an application to prevent a data processing unit from entering a sleep or other power saving mode. As a result, the data processing unit consumes power that would not have been consumed had the power saving mode been entered. Multiple applications may hold a wake lock at the same time. In converting the holding of a wake lock into a power consumption that can be assigned to an application, each request or release of a wake lock by an application can be taken as a trigger demarcating the end of a period. The total power consumption for that period can be determined by multiplying the duration of the period by the power that was not saved as a result of the data processing unit not entering a power saving mode. This total power consumption can then be divided by the number of applications that held the wake lock during the period and the resulting quotient can be attributed to those applications in a column 430 of table 410 (FIG. 4).

Hardware Sensors such as accelerometers, compasses, digital cameras, global positioning systems, and the like: Applications that use such sensors can be required to request that the data from the sensor be delivered to the applications. In the absence of a request, hardware sensors can remain inactive. The requests can be used as the basis for attributing power consumption by the sensor to different applications. Since multiple applications may request to receive the data from a sensor at the same time, periods can be demarcated based on requests and the total power consumption for each period can be distributed among the applications that receive sensor data during each period.

LCD Screen and Backlight:

The display of graphics by an LCD screen and its backlight can be converted into a power consumption by multiplying the duration of a period in which the LCD screen and its backlight are within a brightness range by an estimate of the power consumed within that brightness range per unit time.

$$P_{LCD} = \sum_{i=1}^{n} t_i E_i + BE \sum_{i=1}^{n} t_i \qquad \text{Equation 1}$$

In implementations where the power consumption is be assigned to the LCD screen and its backlight as components, Equation 1 can be used:
where "$P_{LCD}$" is the power consumption is be attributed to the LCD screen and its backlight; "$t_i$" is the duration of a period "i;" "$E_i$" is an estimate of the excess power consumed by the LCD screen and its backlight during each period "i" (i.e., in excess of a baseline estimate "BE" of the power consumed by the LCD screen and its backlight at the lowest brightness); and there are "n" periods of operation by the LCD screen and its backlight.

$$P_{LCD} = t_i E_i \qquad \text{Equation 2}$$

In implementations where the power consumption by the LCD screen and its backlight is to be assigned to an application, Equation 2 can be used:
wherein "$P_{app}$" is the power consumption is be attributed to the application for a period "i" of a duration "$t_i$," and "$E_i$" is an estimate of the excess power consumed by the LCD screen and its backlight during period "i."

OLED Display Screen:

The display of graphics by an OLED display screen can be converted into a power consumption by counting the number of pixels at certain colors and brightnesses and multiplying the number by an estimate of the power needed to maintain a pixel at that color and brightness. In some implementations, the color, the brightness, or both the color and brightness of groups of pixels can be averaged (e.g., by smoothing pixels using, e.g., bi-linear interpolation) and the average(s) can be multiplied by an estimate of the power needed to maintain that group of pixels at the average(s). Such estimates of power consumption can be attributed to the OLED display screen or to the application(s) that present graphical images on the OLED display screen.

Phone Radio in an Idle State:

Maintaining the phone radio in an idle state can be converted into a power consumption by multiplying the duration of different periods in which the signal strength is within a certain range by an estimate of the power consumed within that signal strength range per unit time. In implementations where the power consumption is be assigned to the phone radio as a component, Equation 3 can be used:

$$P_{idle} = \sum_{i=1}^{n} t_i E_i + BE \sum_{i=1}^{n} t_i \qquad \text{Equation 3}$$

where "$P_{idle}$" is the power consumption is be attributed to an idle phone radio as a component; "$t_i$" is the duration of each idle period "i;" "$E_i$" is an estimate of the excess power consumed by the phone radio during each idle period "i" (i.e., in excess of a baseline estimate "BE" of the power consumed by the phone radio at the highest signal strength range); and there are "n" idle periods of the phone radio within different signal strength ranges.

Calling with the Phone Radio:

Calling with the phone radio can be converted into a power consumption by multiplying the duration of different calling periods in which the signal strength is within a certain range by an estimate of the power consumed within that signal strength range per unit time calling.

WI-FI Transceiver (i.e., Transceivers Based on the IEEE 802.11 Standards):

The power consumed by a WI-FI transceiver is a function of signal strength and state (e.g., scanning, multicast, etc.). The data transmission and reception activities of a WI-FI transceiver can be assigned to a different bin according to an average signal strength of those activities in that state. In other words, there may be a total of M*Z bins in an electronic device, wherein M is the number of signal strength ranges and Z is the number of different states. Estimates of the power consumption can be attributed to one or both of:

the WI-FI transceiver itself and added to the amount of power attributed to that WI-FI transceiver in a column 420 of table 405 (FIG. 4), and the application for which data transmission and reception activities were performed and added to the amount of power attributed to that application in a column 430 of table 410 (FIG. 4).

Audio and Video Components such as headphones, dedicated decompression hardware, and the like: Applications that use audio and video components can be required to request that the audio and video components be activated for use. In the absence of a request, audio and video components can remain inactive. The requests can be used as the basis for attributing power consumption by the audio and video components to different applications.

Figure 9:
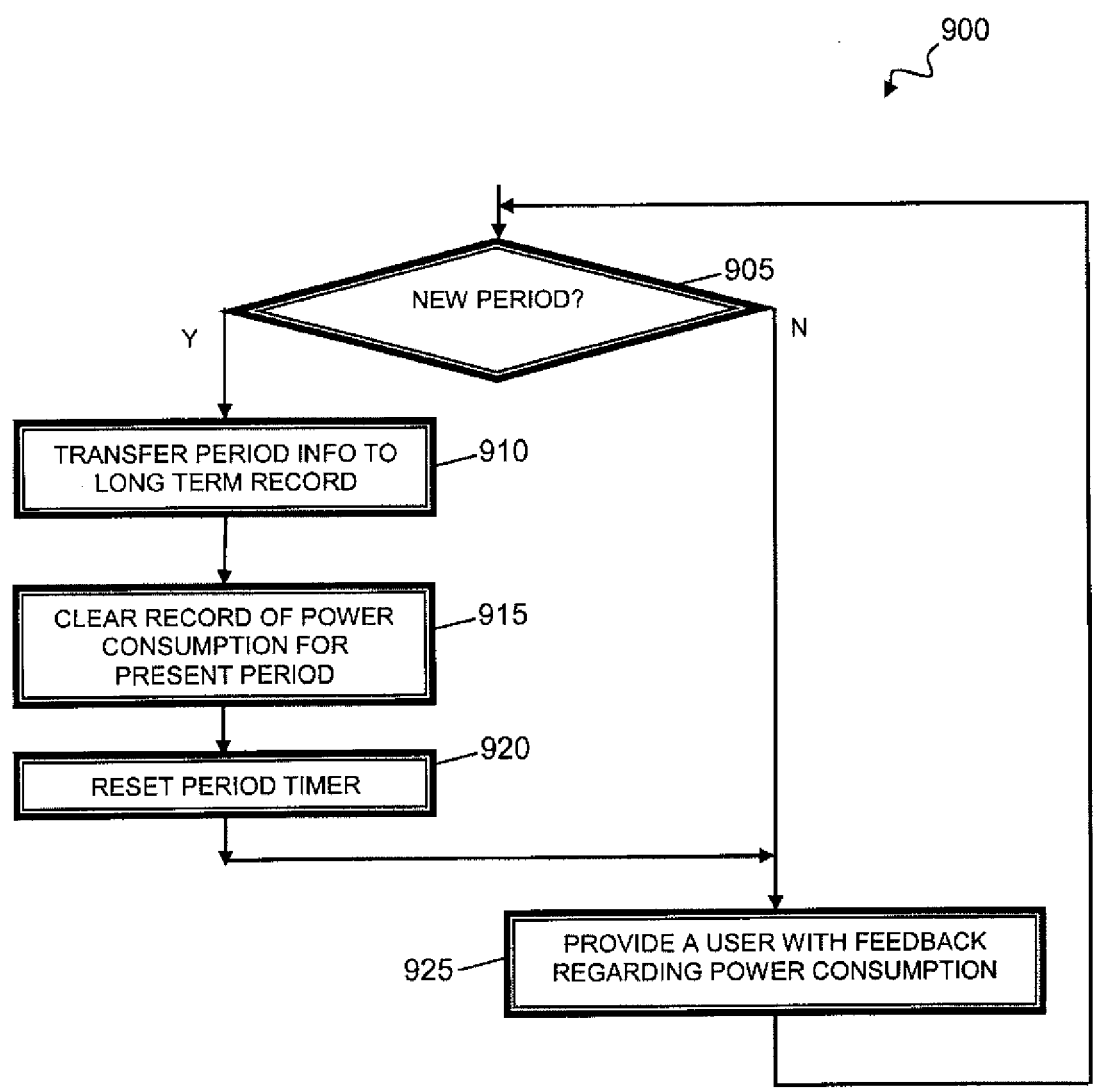
FIG. 9 is a flowchart of a process that can be performed by a battery-operated electronic device to provide a user with feedback regarding power consumption.

FIG. 9 is a flowchart of a process 900 that can be performed by a battery-operated electronic device to provide a user with feedback regarding power consumption. Process 900 can be performed by one or more digital data processing devices that perform operations by executing one or more sets of machine-readable instructions. For example, process 900 can be performed by data processing unit 225 executing a consumption feedback application 250 (FIG. 2). Process 900 can be performed in isolation or in conjunction with other digital data processing operations. For example, process 900 can perform process 300 in order to provide a user with feedback regarding power consumption in the present period at block 925, as described further below (FIG. 3).

The device performing process 900 can determine whether a new period is starting at decision block 905. Different periods can be delineated, e.g., by the electronic device being turned on or off, charging of the electronic device being started or ended, the user of the electronic device switching, or by other occurrences. The start of a new period can be identified, e.g., by sensing power-up or power down of the device, sensing the beginning or ending of battery charging, a change in the user who is logged into the device, or the receipt of a manual trigger that identifies the start of a new period.

In response to determining that a new period has started, the device performing process 900 can transfer information describing the power consumption by different aspects of the electronic device during the period that ended into a long term record of power consumption at block 910. The power consumption information for the present period can be added to a longer term record of power consumption in order to document to power consumption by different aspects of the device over extended periods. The actual term of the long term can be, e.g., a calendar period (e.g., a week, a month, or a year) or the lifespan of the electronic device.

Figure 10:
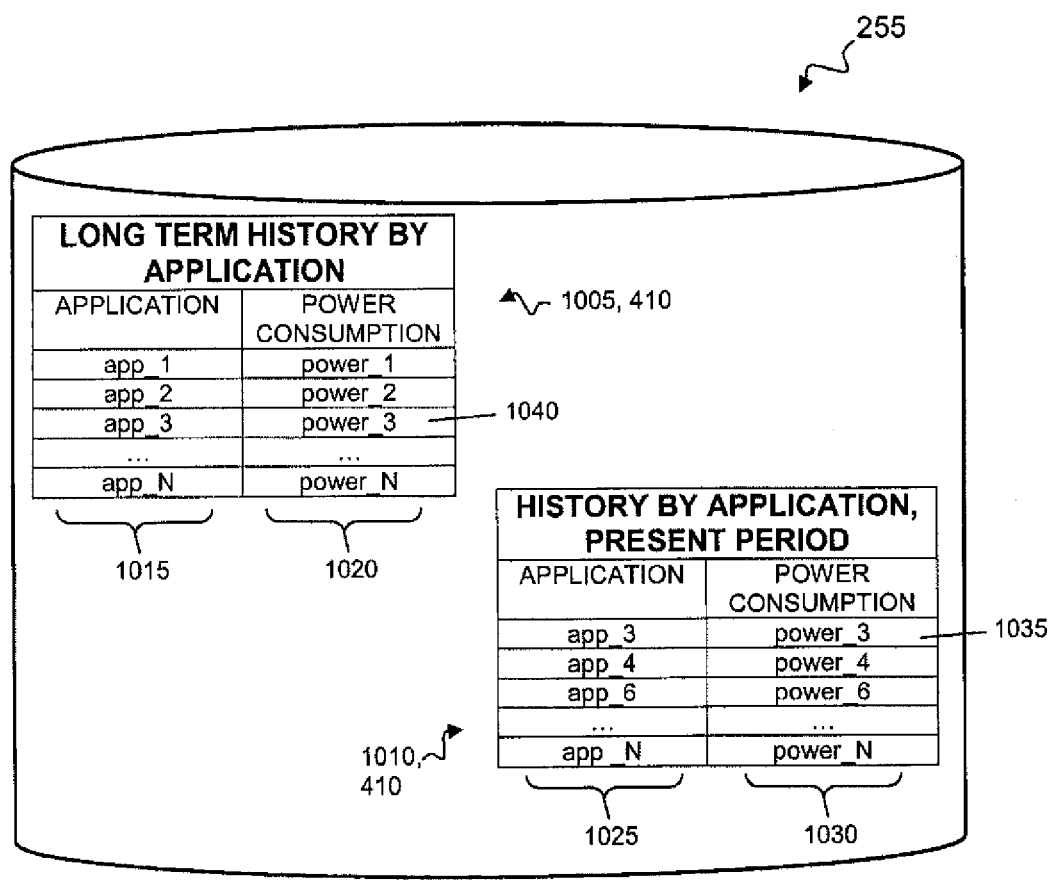
FIG. 10 is a schematic representation of a long term record of power consumption by different applications, as well as a record the power consumption for the present period by different applications.

FIG. 10 is a schematic representation of a long term record 1005 of power consumption by different applications, as well as a record 1010 the power consumption for the present period by different applications.

Long term record 1005 is a data structure that associates identifiers of the applications to which power consumption is attributed in a column 425 with information describing the amount of power that has been attributed to those respective applications over a long term in a column 1020. Present period record 1010 is a data structure that associates identifiers of the applications to which power consumption is attributed in a column 1025 with information describing the amount of power that has been attributed to those respective applications over the present period in a column 1030. Either present period record 1010 or long term record 1005 can implement history by application table 410 (FIG. 4).

In transferring power consumption information from present period record 1010 to long term record 1005, a data processing device can add the power consumption attributed to an application in the present period to the power consumption attributed to an application over the long term. For example, in the illustrated implementation, the power consumption attributed to an application "app_3" in the present period (i.e., field 1035 in column 1030) can be added to the power consumption attributed to that same application "app_3" over the long term (i.e., field 1040 in column 1020). As shown, power consumption will generally be attributed to more applications over the longer term than in the present period.

Returning to FIG. 9, the device performing process 900 can also clear a record describing the power consumption by different aspects of the electronic device during the present period at block 915. For example, both the identifiers of the applications in column 1025 and the information describing the amount of power that has been attributed to those respective applications in column 1030 can be cleared from a present period record 1010 (FIG. 10).

The device performing process 900 can also reset a period timer in response to determining that a new period has started at block 920. Such a period timer can be used to present text or other information 155 that identifies the period of time for which power consumption feedback is present in feedback presentation 110 (FIG. 1).

The device performing process 900 can also provide a user with feedback regarding power consumption at block 925. For example, the device can perform process 300 (FIG. 3), with or without process 700 (FIG. 7) in order to provide feedback regarding the power consumption in the present period. As another example, the device can provide feedback regarding the long term power consumption by aspects of the electronic device.

Figure 11:
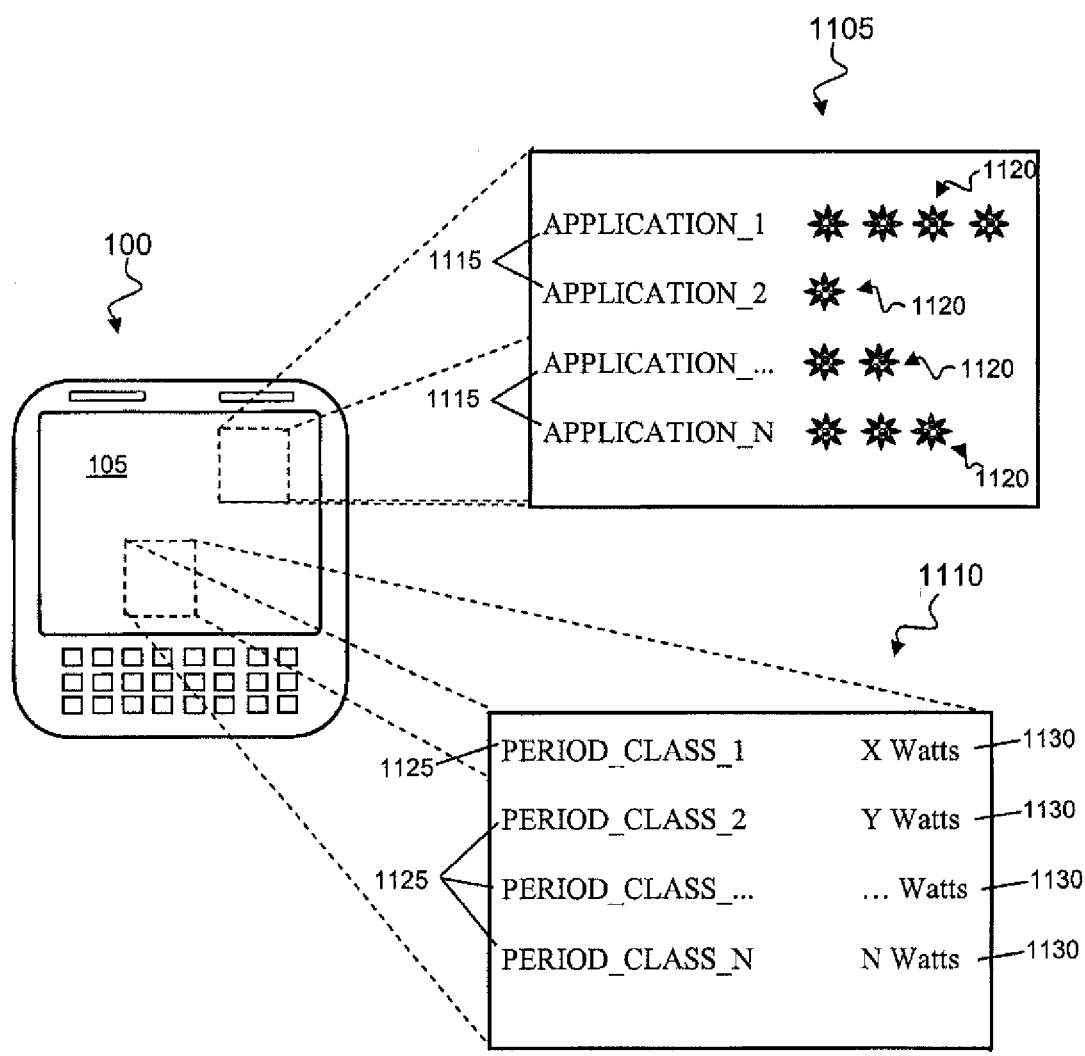
FIG. 11 is a schematic representation of how a user can be provided with feedback regarding power consumption by aspects of a battery-operated electronic device.

FIG. 11 is a schematic representation of how a user can be provided with feedback regarding power consumption by aspects of a battery-operated electronic device 100.

Portions of display screen 105 include power consumption feedback presentations 1105, 1110. Power consumption feedback presentation 1105 includes a collection of application identifiers 1115 that are each associated with a respective power rating indicium 1120. Application identifiers 1115 identify applications that can be or have been executed on the electronic device. For example, application identifiers 1115 can identify applications that are available to be downloaded from an application developer or supplier. Power rating indicia 1120 are pictorial symbols or other indicia that indicate the amount of power consumed by the identified applications.

The power consumption represented by power rating indicia 1120 can be determined in a number of ways. For example, in some implementations, the amount of power consumed by an application can be determined from a long term record of the power consumption by that application, such as long term record 1005 (FIG. 10). Power rating indicia 1120 can thus indicate the amount of power consumed by the identified applications as executed on that same electronic device. As another example, in some implementations, power rating indicia 1120 can be determined from records of the power consumption by that application on one or more other devices. For example, a developer or supplier can collect records of power consumption by an application executed on a collection electronic devices. These collected records can then be used to determine an average power consumed by the application and generate a power rating for the application.

Records of power consumption by applications are particularly relevant when applications can be developed by multiple developers. In particular, different developers may have different levels of expertise and may develop similar applications that consume different amounts of power. When the amount of power consumed by the different applications is rated, a user can consider power consumption as a factor in deciding whether to install or execute an application.

Power consumption feedback presentation 1110 includes a collection of identifiers 1125 of different classes of periods that are each associated with a respective power indicium 1130. Identifiers 1115 identify different classes of periods of time when electronic device 100 is in use. For example, a class of periods may occur at certain hours during the day (e.g., "noon-2 PM," "2 PM-4 PM"), a class of periods may occur when electronic device 100 is used by specific users ("Jeanne," "Julie"), or the like. Power indicia 1130 include text or other indicia that indicates the average amount of power consumed during the identified classes of periods. The power consumption represented by power indicia 1130 can be determined in a number of ways. For example, in some implementations, a number different long term records of power consumption can be created, with each long term record associated with a different class. In response to a new period starting, the power consumption records for the former period can be transferred to the records dedicated to periods of this class.

Various implementations of the systems, methods, and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems, methods, and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems, methods, and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems, methods, and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
attributing, by a battery-operated electronic device that comprises a data processing apparatus and a hardware component other than a battery, power consumption resulting from usage of the hardware component to the hardware component and to a software application that uses the hardware component; and
presenting power consumption feedback, using the data processing apparatus, the power consumption feedback separately identifying (i) the hardware component, (ii) the software application, and (iii) the power consumption resulting from the usage.

2. The method of claim 1, further comprising:
monitoring usage of the hardware component by the software application; and
converting the usage of the hardware component into a power consumption that is attributed to the software application.

3. The method of claim 2, wherein:
the hardware component comprises a wireless transceiver; and
converting the usage of the hardware component into the power consumption comprises identifying a range of signal strengths during the usage of the wireless transceiver.

4. The method of claim 2, wherein:
the hardware component comprises a display; and converting the usage of the hardware component into the power consumption comprises identifying a brightness state of the display during the usage.

5. The method of claim 1, further comprising:
identifying a start of a new period; and
clearing a record of power consumption for the previous period in response.

6. The method of claim 5, further comprising transferring information in the record of power consumption for the previous period into a long term record of power consumption in response to the identification of the start of the new period.

7. The method of claim 1, wherein presenting the power consumption feedback to the user comprises displaying a presentation that identifies software applications and indications of amounts of power consumed by the identified software applications.

8. The method of claim 1, wherein presenting the power consumption feedback to the user comprises displaying a presentation that identifies different classes of periods and indications of average amounts of power consumed during operation within the different classes.

9. A battery-operated electronic device comprising:
a battery;
a collection of battery-operated hardware components including a data processing unit configured to execute a plurality of different software applications; and
a display screen,
wherein the data processing unit is operable to:
attribute power consumption resulting from usage of a particular one of the collection of battery-operated hardware components to the particular one of the collection of battery-operated hardware components and to a software application of the plurality of different software applications that uses the particular one of the collection of battery-operated hardware components; and
present on the display screen power consumption feedback that separately identifies (i) the particular one of the collection of battery-operated hardware components, (ii) the software application, and (iii) the power consumption resulting from the usage.

10. The electronic device of claim 9, further comprising a power measurement unit, the power measurement unit implemented in hardware and for measuring a parameter characterizing power consumed by a first hardware component of the collection of battery-operated hardware components.

11. The electronic device of claim 10, wherein the power measurement unit comprises an ammeter.

12. The electronic device of claim 9, wherein the display screen presents an accounting of power consumed by individual battery-operated hardware components in the collection.

13. The electronic device of claim 9, further comprising a data storage device, the data storage device storing:
a structured collection of information characterizing power consumed by the different software applications during a present period; and
a structured collection of information characterizing power consumed by the different software applications over a long term, the long term being longer than the present period.

14. The electronic device of claim 9, wherein the data processing unit is configured to monitor activities performed using battery-operated hardware components in the collection by the different software applications and to calculate power consumption estimates attributable to respective of the different software applications.

15. The electronic device of claim 14, further comprising one or more persistent data storage devices storing conversion rules for estimating power consumptions by the different software applications.

16. A non-transitory computer storage medium encoded with a computer program, the program comprising instructions that when executed by data processing apparatus cause the data processing apparatus to perform operations, the operations comprising:
monitoring activities performed by applications executed by a data processing apparatus of a battery-operated electronic device that includes one or more hardware components; and
presenting, on a display screen of the battery-operated electronic device an accounting of estimated power consumption associated with a particular one of the monitored activities, the accounting separately identifying (i) the estimated power consumption, (ii) the application that performed the particular one of the monitored activities, and (iii) the one or more hardware components used by the application to perform the activity.

17. The storage medium of claim 16, wherein converting the activities into power consumptions comprises identifying that the first application requests that a hardware sensor be active.

18. The storage medium of claim 16, wherein the operations further comprise recording information characterizing the power consumptions in association with information identifying hardware components used by the applications to perform the activities.

19. The method of claim 1 wherein the hardware component is a phone radio.

20. The method of claim 1 including displaying the power consumption feedback on a display of the battery-operated electronic device.

* * * * *